United States Patent [19]

Kurauchi et al.

[11] Patent Number: 4,900,420

[45] Date of Patent: Feb. 13, 1990

[54] PROCESS FOR PREPARING A HIGHLY SELECTIVE FLUORINATED ANION EXCHANGE MEMBRANE

[75] Inventors: Yasuhiro Kurauchi; Toru Seita, both of Shin-nanyo; Kiyohide Matsui, Sagamihara; Kikuo Sugimoto, Kanagawa, all of Japan

[73] Assignee: Tosoh Corporation, Shin-nanyo, Japan

[21] Appl. No.: 177,844

[22] Filed: Mar. 28, 1988

Related U.S. Application Data

[63] Continuation of Ser. No. 918,061, Oct. 14, 1986, abandoned.

[30] Foreign Application Priority Data

Oct. 14, 1985 [JP] Japan .................. 60-228290
Oct. 14, 1985 [JP] Japan .................. 60-228291

[51] Int. Cl.⁴ .................. B01D 13/02; C08D 5/20; C08F 226/00
[52] U.S. Cl. .................. 204/296; 204/301; 521/27; 521/32; 526/248
[58] Field of Search .................. 204/295, 296, 98, 301; 521/27, 28, 31, 32, 33, 38; 526/248

[56] References Cited

U.S. PATENT DOCUMENTS

| | | | |
|---|---|---|---|
| 3,985,501 | 10/1976 | Grot | 521/31 |
| 4,082,701 | 4/1978 | Fries et al. | 521/32 |
| 4,126,588 | 11/1978 | Ukihashi et al. | 521/31 |
| 4,294,943 | 10/1981 | Onoue et al. | 521/31 |
| 4,298,699 | 11/1981 | Asawa et al. | 521/31 |
| 4,567,206 | 1/1986 | Matsui et al. | 521/32 |

Primary Examiner—John F. Niebling
Assistant Examiner—Ben C. Hsing
Attorney, Agent, or Firm—Oblon, Spivak, McClelland, Maier & Neustadt

[57] ABSTRACT

A process for preparing an anion exchange membrane, which comprises subjecting a carboxylate membrane made of a copolymer having repeating units of the formula:

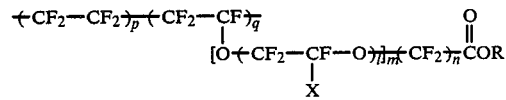

wherein X is F or $CF_3$, l is an integer of from 0 to 5, m is 0 or 1, n is an integer of from 1 to 5, and p/q is from 4 to 16, and R is an alkyl group, to an acid or base treatment, and then introducing anion exchange groups thereinto.

21 Claims, 8 Drawing Sheets

100μm

100μm

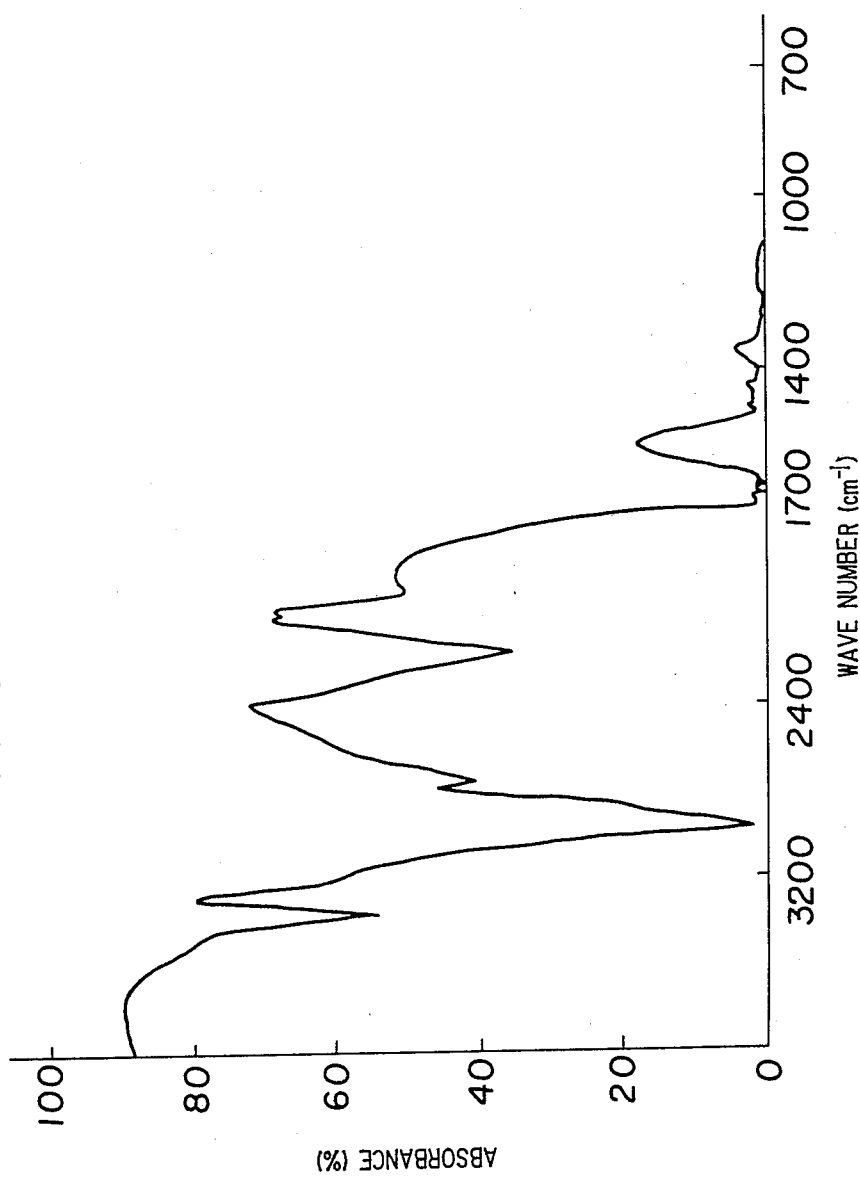

PROCESS FOR PREPARING A HIGHLY SELECTIVE FLUORINATED ANION EXCHANGE MEMBRANE

This application is a continuation of application Ser. No. 918,061 filed on Oct. 14, 1986, now abandoned.

The present invention relates to a process for producing an anion exchange membrane having high ion selectivity.

In recent years, anion exchange membranes have been used in various fields, for instance, as diaphragms for electrodialysis or diffusion dialysis for the purification and separation of a mixture containing ionic substances and for the treatment of waste liquids, or as diaphragms for electric cells. Most of the anion exchange membranes presently employed are hydrocarbon-type.

On the other hand, the present inventors have developed fluorinated anion exchange membranes composed of a fluorocarbon polymer which is superior to the conventional hydrocarbon-type in the acid resistance, oxidation resistance, solvent resistance, etc. These membranes exhibit excellent stability even under a severe condition such as an oxidative condition or a strongly acidic condition under which the conventional hydrocarbon type anion exchange membranes can not be used. However, they do not necessarily exhibit a fully satisfactory performance in respect of the selective permeability to ions depending upon the condition in use. Therefore, it has been desired to develop an anion exchange membrane which has a high current efficiency and excellent selective permeability to ions while maintaining the durability to severe conditions, such as oxidation resistance or heat resistance.

In the case of the hydrocarbon-type, the following methods may be mentioned as typical methods for the preparation of ion exchange membranes having selective permeability.

(1) A composite membrane is prepared which has a highly dense layer on its surface. For instance, a thin layer of an ion exchange resin having a dense structure is coated on the surface of an ordinary ion exchange membrane (e.g. a phenol sulfonic acid-phenol type condensation resin in the case of a cation exchange membrane, and a m-phenylenediamine-phenol condensation resin in the case of an anion exchange membrane) (T. Yawataya; Dechema Monograph 47, 501 (1962)). Here, it is expected to provide a mechanical sieving effect to the surface of the membrane by providing a dense layer on the surface. It is thereby possible to improve the selectivity for monovalent ions, but there is a drawback that the electric resistance increases.

(2) Treatment for selectivity is applied by means of a polymer electrolyte. In the electrodialytic concentration of sea water by means of a cation exchange membrane, it has been proposed to substantially prevent the permeation of bivalent ions by preliminarily adding a small amount of a selectivity-imparting agent to the sea water (Ishii, Asawa; Asahi Glass Research Report, 20, 151 (1970)).

(3) A variety of cationic high molecular weight electrolytes containing polyethyleneimine (PEI), are deposited on the surface of a cation exchange membrane, whereby the selective permeability to monovalent ions can be improved (T. Sata; J. Colloid & Intersurt. Sci, 44, 393 (1973). By this method, a thin layer of cationic high molecular weight electrolytes is formed on the surface of a cation exchange membrane, whereby bivalent or polyvalent cations receive stronger repellency than monovalent cations, and it becomes more difficult for the ions to pass through this layer as the valency of the ions is higher.

However, all of these methods are directed to the treatment of the hydrocarbon-type membranes, and the membranes thereby obtained are hardly useful by themselves in a system where an oxidating agent is generated or under a high temperature condition. Thus, their applications used to be limited.

In order to solve these problems, it has been desired to develop an anion exchange membrane which has a high level of current efficiency while maintaining the durability to severe conditions, such as oxidation resistance and heat resistance.

The present inventors have previously proposed novel anion exchange membranes made of a polymer having a perfluorocarbon as the main chain.

The proposed anion exchange membranes have various excellent features as compared with the conventional hydrocarbon-type anion exchange membranes, such that (1) they are stable against repetition of drying and wetting, (2) they have excellent durability against oxidative conditions, (3) they have excellent heat resistance, and (4) they have excellent solvent resistance.

However, in such a case as recovering an acid by electrodialysis, if such an anion exchange membrane is employed, protons tend to reversely diffuse through the anion exchange membrane, and from the aspect of the current efficiency, there has been a problem in its use for an industrial process.

The present inventors have conducted extensive researches to develop an anion exchange membrane which does not bring about this reverse diffusion and which is capable of providing a high level of current efficiency. As a result, they have found that prevention of reverse diffusion of protons and high current efficiency at acid recovery can be achieved by subjecting a carboxylate membrane used as a starting membrane for the above-mentioned fluorinated anion exchange membrane, to acid or base treatment, and then introducing anion exchange groups. The process of the present invention has been accomplished on the basis of this discovery.

Thus, the present invention provides a process for preparing an anion exchange membrane, which comprises subjecting a carboxylate membrane made of a copolymer having repeating units of the formula:

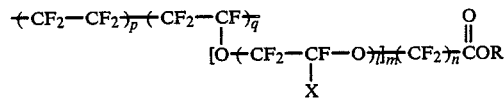

wherein X is F or $CF_3$, $l$ is an integer of from 0 to 5, m is 0 or 1, n is an integer of from 1 to 5, and p/q is from 4 to 16, and R is an alkyl group, to an acid or base treatment, and then introducing anion exchange groups thereinto.

Now, the present invention will be described in detail with reference to the preferred embodiments.

In the accompanying drawings:

FIG. 7 is an infrared absorption spectrum after the amine treatment in Comparative Example 1.

Figure 1:
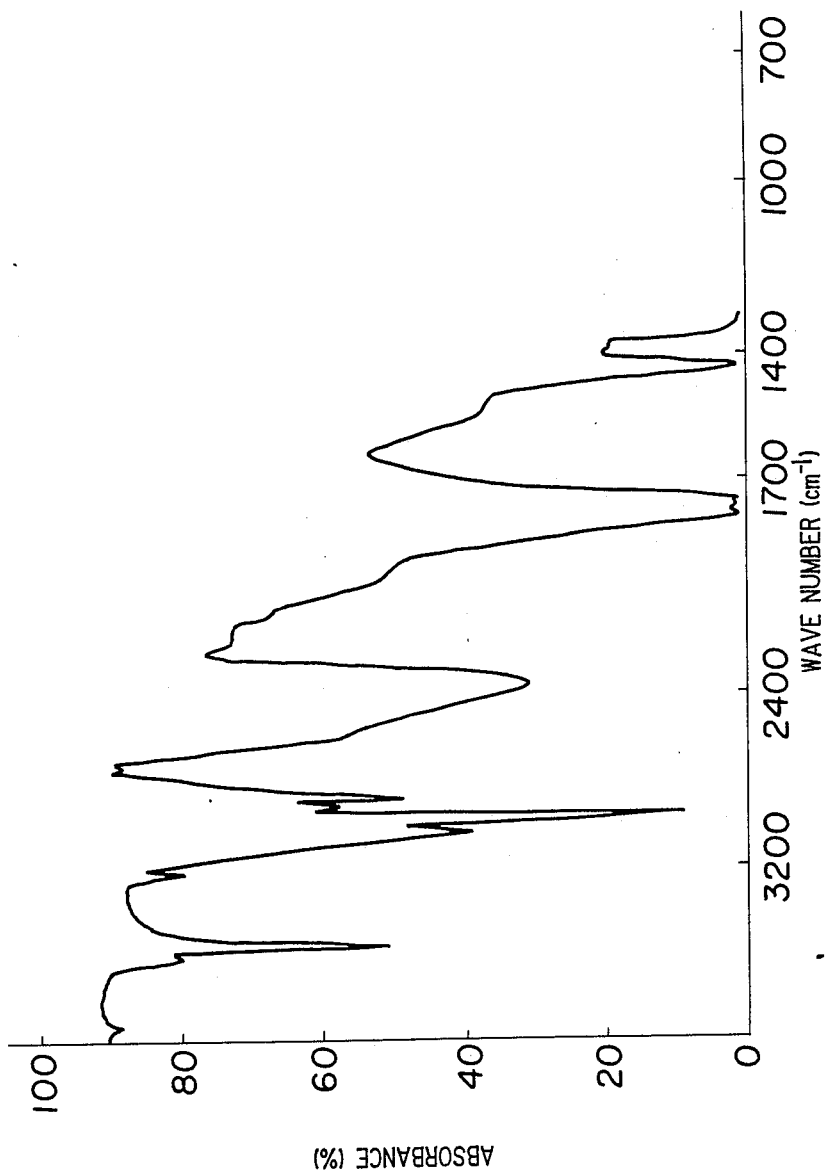
FIG. 1 is an infrared spectrum of a copolymer used in the present invention.

For the carboxylate membrane to be used in the process of the present invention, polymers having repeating units represented by the following structures may be mentioned as specific examples.

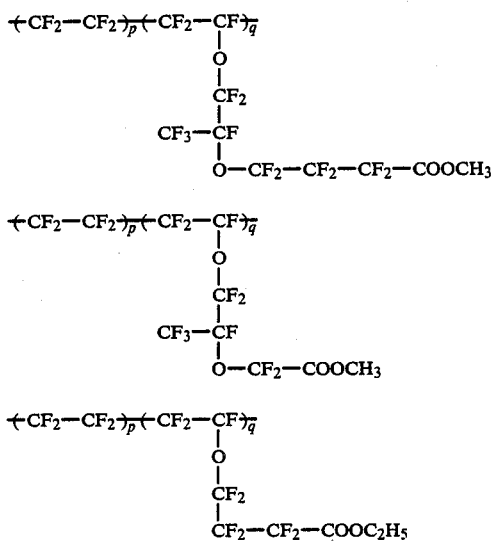

In the present invention, the above-mentioned carboxylate membrane may be adjusted so that the ion exchange capacity of the resulting anion exchange membrane will be within a range of from 0.16 to 30 meq/g dry resin, preferably within a range of from 0.5 to 2.8 meq/g dry resin.

Further, the carboxylate membrane may be adjusted so that the thickness of the resulting anion exchange membrane will be within a range of from 40 to 500 μm, preferably within a range of from 100 to 300 μm.

In order to increase the strength of the membrane, a reinforcing material having a Teflon ® network structure or a reinforcing material such as Teflon ® fibril fibers or glass wool, may be incorporated.

The above-mentioned carboxylate membrane is treated with an acid or base at its one side or both sides, as the case requires. For the acid or base treatment, there may be mentioned a method wherein the carboxylate membrane obtained as mentioned above, is directly dipped in an acid or base solution so that both sides will be subjected to the acid or base treatment, or a method wherein one side of the carboxylate membrane obtained, is protected by a sheet of polymer having water repellency and a good property for press-bonding to the carboxylate membrane, such as a polyester, polyethylene or Teflon ®, and then immersed in an acid or base solution so that only one side is treated, or a method wherein the carboxylate membrane obtained as above is liquid-tightly clamped by means of a cell frame made of e.g. polyester having a durability in an acid or base solution, such as a cell frame for electrolysis, and then subjected to an acid or base treatment, or a method wherein the treatment is conducted by means of a gaseous acid or base.

In the above-mentioned carboxylate membrane, the polymer skeleton or the side chain is made of a perfluorocarbon polymer, and the terminal ester is very active. Accordingly, the acid or base treatment can be conducted without stirring the acid or base solution and without bringing about unevenness in the reaction for hydrolysis. However, it is preferred to stir the solution to prevent an uneven reaction.

The acid to be employed may be any acid so long as it is useful as an acid catalyst for hydrolysis. However, it is preferred to use a mineral acid such as hydrochloric acid, sulfuric acid or nitric acid, which is relatively easy to handle.

The base to be employed may be any base so long as it is useful as a base catalyst for hydrolysis. However, it is preferred to use an alkali metal or alkaline earth metal hydroxide such as potassium hydroxide, sodium hydroxide or calcium hydroxide, ammonia or ethylenediamine, which is relatively easy to handle.

The acid or base is used usually in a concentration of from 0.1 to 100%, and may be used in the form of a gas or an aqueous solution.

Preferably, the acid or base is used in the form of an aqueous solution having a concentration of from 1 to 40% so that the reaction can most advantageously be conducted.

The acid treatment may be conducted within a temperature range of from 0 to 100° C. However, a temperature within a range of from 25 to 40° C. is preferred for the control of the rate or the degree of the hydrolysis.

Whereas, the base treatment may be conducted within a temperature range from not higher than the boiling point of ammonia to the boiling point of an aqueous solution. Namely, the base treatment can be conducted within a range of from −80° C. to 110° C. However, a temperature within a range of from 0 to 40° C. is preferred in view of the reaction rate or the convenience for the reaction.

The thickness of the membrane treated with an acid or base is closely related with the properties of the membrane finally obtained, and therefore usually treated within a range of from 1 to 80%. However, it is preferred to have the membrane treated within a range of from 10 to 60% in order to avoid an undue increase of the membrane resistance and to avoid a deterioration of the properties of the ion exchange membrane such as the transport number and cell voltage.

The following three routes may be mentioned as methods for the introduction of the anion exchange groups to the membrane treated with an acid or base as mentioned above.

Route 1

$R_fCOOR^4 \longrightarrow$ acid or base treatment $\longrightarrow$

-continued
Route 1

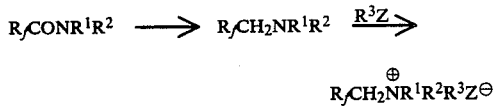

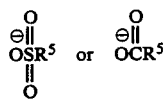

wherein:
$R^1$, $R^2$, $R^3$=lower alkyl group,
$R^4$=lower alkyl group,
$Z^\ominus$=counter ion for the quaternary ammonium ion, such as halogen anion, $NO_3^\ominus$, $\frac{1}{2}(SO_4^{2\ominus})$, $BF_4^\ominus$, $SbCl_6^\ominus$, $$\overset{\ominus}{O}\overset{O}{\underset{\underset{O}{\|}}{S}}R^5 \quad \text{or} \quad \overset{\ominus}{O}\overset{O}{\underset{\|}{C}}R^5$$

wherein $R^5$=lower alkyl group, substituted or unsubstituted phenyl group, or lower perfluoroalkyl group.

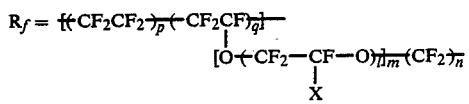

wherein X is F or $CF_3$, l is an integer of from 0 to 5, m is 0 or 1, n is an integer of from 1 to 5, and p/q is from 4 to 16.

Now, Route 1 will be described.
The membrane treated with an acid or base and dried under reduced pressure, is reacted with a lower dialkylamine of the formula:

$$HNR^1R^2 \tag{1}$$

to convert it to a carboxylic acid amide membrane. As the lower dialkylamine of the formula (1), there may be mentioned dimethylamine, diethylamine, dipropylamine or methyl ethyl amine. The reaction with such an amine may be conducted by contacting a gaseous amine to the membrane, or in a liquid amine or by using a solvent. As such a solvent, an ether such as diethyl ether, tetrahydrofuran or dioxane, or a hydrocarbon such as benzene, toluene or hexane, may be employed.

The carboxylic acid amide membrane thus obtained, can be converted to an amine membrane by reacting it with a reducing agent. As the reducing agent, lithium aluminum hydride, diborane or the like may be employed. From the viewpoint of the reaction efficiency, it is preferred to employ diborane. The diborane to be used, may be generated, for example, by reacting a boron trifluoride-ether complex with sodium borohydride, or various complexes of borane, such as a dimethylsulfide complex, may be employed.

The reaction can be smoothly conducted in an ether solvent such as tetrahydrofuran, dioxane or diglyme. It is preferred that during the initial stage of the reaction, the reaction system is maintained within a range of from an ice-cooled temperature to room temperature, and then heated to a temperature of from a refluxing temperature to 100° C. to complete the reaction.

The amine membrane thus obtained is reacted with an alkylating agent ($R^3Z$) for alkylation (quaternization), whereby it can be converted to a membrane having quaternary ammonium groups. As the alkylating agent, there may be employed methyl iodide, ethyl bromide, n-propyl bromide, trimethyloxonium fluoroborate (($CH_3$)$_3OBF_4$), triethyloxonium fluoroborate (($C_2H_5$)$_3OBF_4$), trimethyloxonium hexachloroantimonate (($CH_3$)$_3OSbCl_6$) or methyl trifluoromethanesulfonate (($CH_3$)$_3OSbCl_6$). For this alkylation, methanol, ethanol, methylene chloride, chloroform, carbon tetrachloride, hexane, toluene or the like may be employed as the solvent.

Here, if it is necessary to exchange the counter ions of the membrane having quaternary ammonium groups thus obtained, such an exchange of the counter ions can be conducted by the treatment with an alkali metal salt by a conventional method.

Route 2

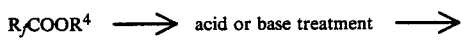

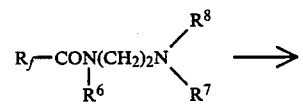

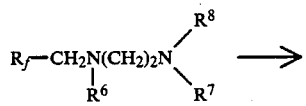

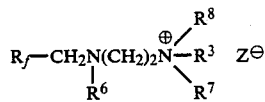

wherein $R^6$ is a hydrogen atom or a lower alkyl group, each of $R^7$, $R^8$ is a lower alkyl group, or $R^6$ and $R^7$ may together form a polymethylene group of the formula $(CH_2)_a$ wherein a is an integer of 2 or 3, and $R^3$, $Z^\ominus$ and $R_f$ are as defined above.

Now, Route 2 will be described.
The membrane treated with an acid or base, is reacted with a diamine having the formula:

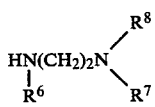
(2)

to convert it to an amino-carboxylic acid amide membrane. As the diamine of the formula (2), N,N-dimethylethylenediamine, N,N,N'-trimethylethylenediamine, N-methylpiperazine or N-propylpiperazine may be mentioned. Instead of the above diamine, a corresponding silyl amine with the above formula (2) in which the hydrogen atom on the nitrogen atom is replaced by a trimethylsilyl group, may be employed.

The reaction with such a diamine, may be conducted in a liquid amine or by using a solvent. As such a solvent, an ether such as diethyl ether, tetrahydrofuran or dioxane, or a hydrocarbon such as benzene, toluene or hexane, may be employed.

The amino-carboxylic acid amide membrane thus obtained, may be converted to a diamine membrane by reacting it with a reducing agent. As such a reducing agent, lithium aluminum hydride or diborane may be employed. In view of the reaction efficiency, it is preferred to employ diborane. The diborane to be used, may be generated, for example, by reacting a boron trifluoride-ether complex to sodium borohydride, or various complexes of borane such as a dimethylsulfide complex, may be employed.

The reaction can be conducted smoothly in an ether solvent such as tetrahydrofuran, dioxane or diglyme. It is preferred that during the initial stage of the reaction, the reaction system is maintained within a range of from an ice-cooled temperature to room temperature, and then heated to a temperature of from a refluxing temperature to 100° C. to complete the reaction.

The diamine membrane thus obtained may be reacted with an alkylating agent for alkylation, whereby it can be converted to a membrane having quaternary ammonium groups. As the alkylating agent, there may be employed methyl iodide, methyl bromide, n-propyl bromide, trimethyloxonium fluoroborate (($CH_3)_3OBF_4$), triethyloxonium fluoroborate (($C_2H_5)_3OBF_4$), trimethyloxonium hexachloroantimonate (($CH_3)_3OSbCl_6$) or methyl trifluoromethane sulfonate. For this alkylation, methanol, ethanol, methylene chloride, chloroform, carbon tetrachloride, hexane or toluene may be employed as the solvent.

Here, if it is necessary to exchange the counter ions of the membrane having quaternary ammonium groups thus obtained, such an exchange may be conducted by the treatment with an alkali metal salt by a conventional method.

Route 3

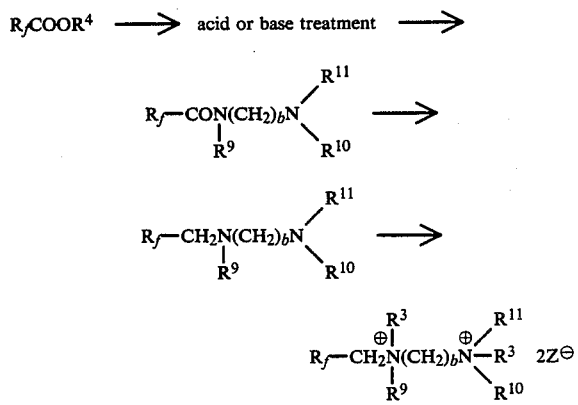

wherein $R^9$ is a hydrogen atom or a lower alkyl group, each of $R^{10}$ and $R^{11}$ is a lower alkyl group, or $R^9$ and $R^{10}$ may together form a polymethylene chain of the formula $(CH_2)_c$ wherein c is an integer of 2 or 3, b is an integer of from 3 to 7, and $R^3$, $Z^\ominus$ and $R_f$ are as defined above.

Now, Route 3 will be described.

The membrane treated with an acid or base is reacted with a diamine having the formula:

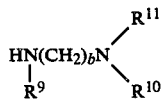 (3)

to convert it to an amino-carboxylic acid amide membrane. As the diamine of the formula (3), N,N-dimethylpropanediamine, N,N,N'-trimethylpropanediamine, N,N-dimethylbutylenediamine, N,N,N'-trimethylbutylenediamine or N,N-diethylpropanediamine may be mentioned. Instead of the above diamine, a corresponding silyl amine having the formula (3) with the hydrogen atom on the nitrogen atom replaced by a trimethylsilyl group, may be employed.

The reaction with such a diamine, may be conducted in a liquid amine or by using a solvent. As such a solvent, an ether such as diethyl ether, tetrahydrofuran or dioxane, or a hydrocarbon such as benzene, toluene or hexane, may be employed.

The amino-carboxylic acid amide membrane thus obtained may be converted to a diamine membrane by reacting it with a reducing agent. As such a reducing agent, lithium aluminum hydride or diborane may be employed. However, from the viewpoint of the reaction efficiency, it is preferred to employ diborane. The diborane to be used, may be generated, for instance, by reacting a boron trifluoride-ether complex to sodium borohydride, or various complexes of borane, such as a methyl sulfide complex, may be employed.

The reaction may be conducted smoothly in an ether solvent such as tetrahydrofuran, dioxane or diglyme. It is preferred that during the initial stage of the reaction, the reaction system is maintained within a range of from an ice-cooled temperature to room temperature, and then heated to a temperature of from a refluxing temperature to 100° C. to complete the reaction.

The diamine membrane thus obtained may be reacted with an alkylating agent for alkylation, whereby it can be converted to a membrane having quaternary ammonium groups. As such an alkylating agent, there may be mentioned methyl iodide, methyl bromide, n-propyl bromide, trimethyloxonium fluoroborate (($CH_3)_3OBF_4$), triethyloxonium fluoroborate (($C_2H_5)_3OBF_4$), trimethyloxonium hexachloroantimonate (($CH_3)_3OSbCl_6$) or methyl trifluoromethanesulfonate. For this alkylation, methanol, ethanol, methylene chloride, chloroform, carbon tetrachloride, hexane or toluene may be employed as the solvent.

Here, if it is necessary to exchange the counter ions of the membrane having quaternary ammonium groups thus obtained, such an exchange can be conducted by the treatment with an alkali metal salt by a conventional method.

As specific examples of the repeating units of the anion exchange membranes thus obtained, the following may be mentioned:

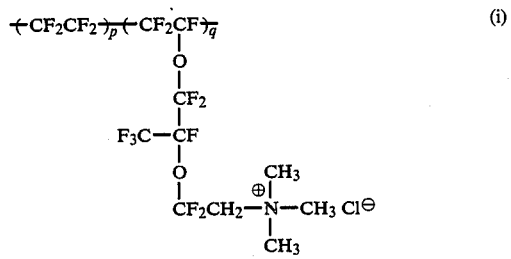 (i)

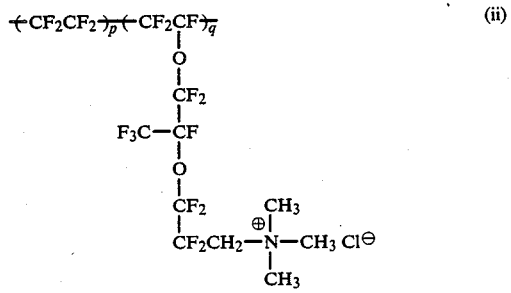 (ii)

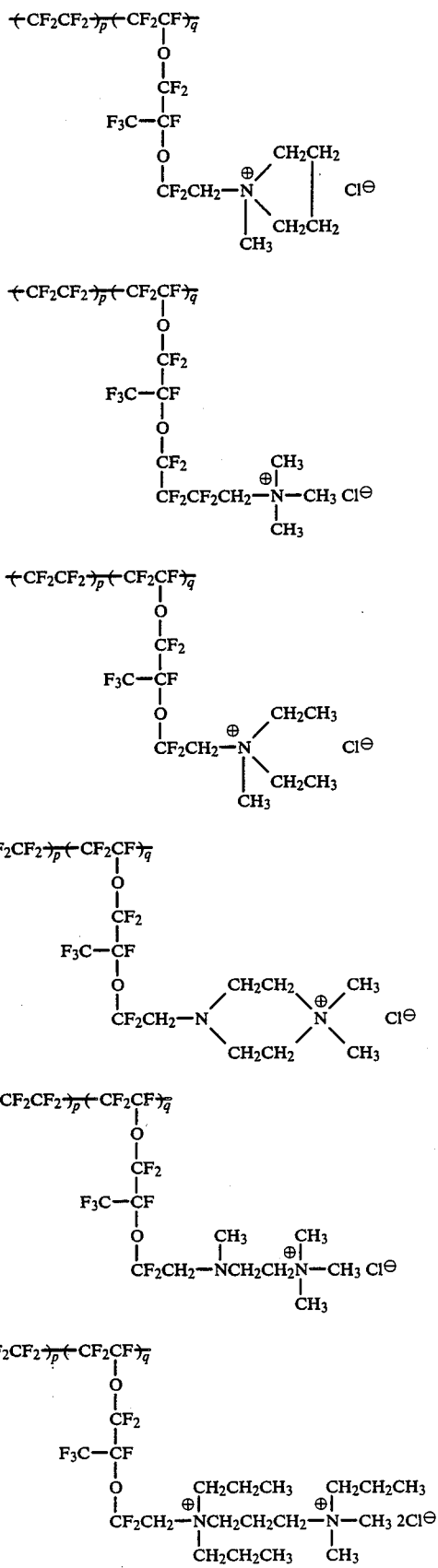

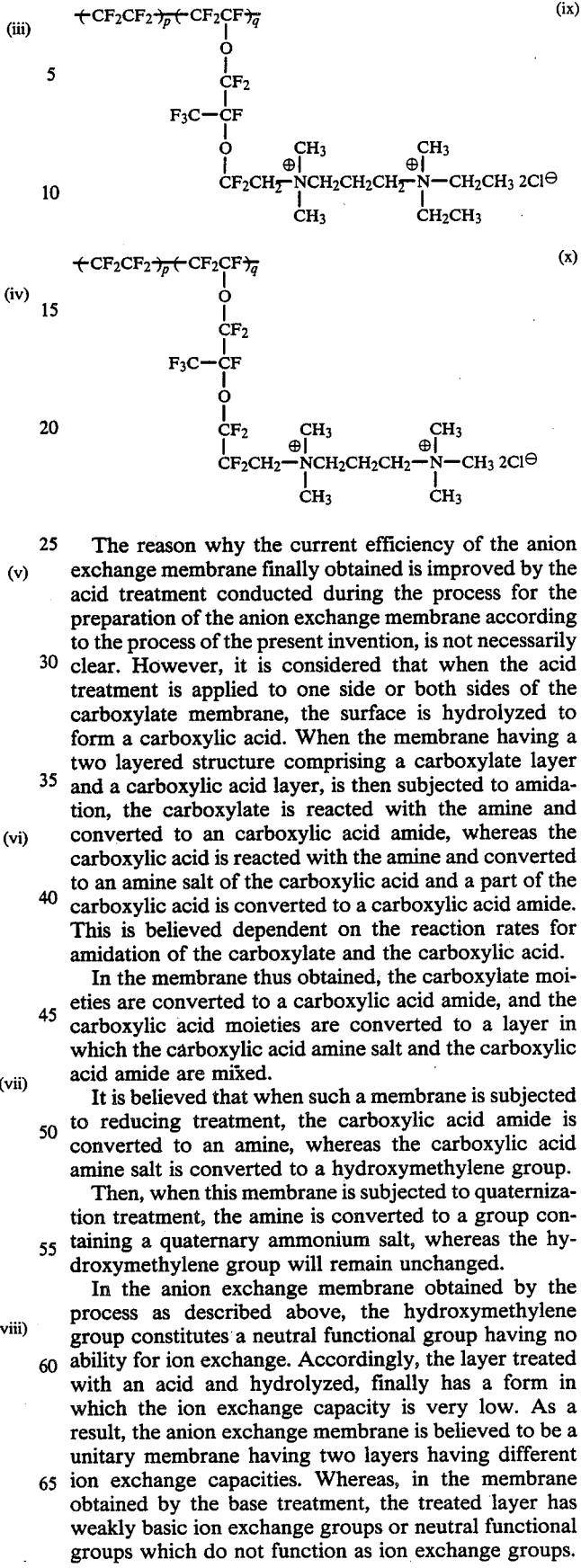

The reason why the current efficiency of the anion exchange membrane finally obtained is improved by the acid treatment conducted during the process for the preparation of the anion exchange membrane according to the process of the present invention, is not necessarily clear. However, it is considered that when the acid treatment is applied to one side or both sides of the carboxylate membrane, the surface is hydrolyzed to form a carboxylic acid. When the membrane having a two layered structure comprising a carboxylate layer and a carboxylic acid layer, is then subjected to amidation, the carboxylate is reacted with the amine and converted to an carboxylic acid amide, whereas the carboxylic acid is reacted with the amine and converted to an amine salt of the carboxylic acid and a part of the carboxylic acid is converted to a carboxylic acid amide. This is believed dependent on the reaction rates for amidation of the carboxylate and the carboxylic acid.

In the membrane thus obtained, the carboxylate moieties are converted to a carboxylic acid amide, and the carboxylic acid moieties are converted to a layer in which the carboxylic acid amine salt and the carboxylic acid amide are mixed.

It is believed that when such a membrane is subjected to reducing treatment, the carboxylic acid amide is converted to an amine, whereas the carboxylic acid amine salt is converted to a hydroxymethylene group.

Then, when this membrane is subjected to quaternization treatment, the amine is converted to a group containing a quaternary ammonium salt, whereas the hydroxymethylene group will remain unchanged.

In the anion exchange membrane obtained by the process as described above, the hydroxymethylene group constitutes a neutral functional group having no ability for ion exchange. Accordingly, the layer treated with an acid and hydrolyzed, finally has a form in which the ion exchange capacity is very low. As a result, the anion exchange membrane is believed to be a unitary membrane having two layers having different ion exchange capacities. Whereas, in the membrane obtained by the base treatment, the treated layer has weakly basic ion exchange groups or neutral functional groups which do not function as ion exchange groups.

Accordingly, such a membrane is believed to provide excellent effects when used for e.g. the recovery of an acid by electrodialysis. However, it should be understood that the above-mentioned assumption is not in any way intended to limit the present invention.

Now, the present invention will be described with reference to Examples. However, it should be understood that the present invention is by no means restricted by these specific Examples.

In the Examples, for the measurement of the thickness of the acid-treated layer of the membrane, the membrane was dyed with crystal violet (in a methanol solution), and the cross section of the membrane was photographed to determine the thickness of the layer. Further, the reacted membrane was analyzed by an infrared absorption spectrum for each step.

The membrane resistance of the anion exchange membrane obtained, was determined by measuring the alternate current resistance at 1000 Hz in a 0.5 N sodium chloride aqueous solution at 25° C.

The transport number was measured at 25° C. in nitric acid, hydrochloric acid or sulfuric acid.

The ion exchange capacity of the membrane obtained, was determined by adding a 0.5 N sodium hydroxide aqueous solution to a membrane of a quaternary ammonium chloride type to ion-exchange chlorine ions, and analyzing the chlorine ion concentration by ion chromatography.

EXAMPLE 1

$CF_2=CFOCF_2CF(CF_3)O(CF_2)_3COOCH_3$, trichlorofluoroethane and azobisisobutyronitrile as a catalyst, were charged into a stainless steel pressure resistant reactor, and the reactor was thoroughly flushed with liquid nitrogen. Then, the reactor was heated to 70° C., and ethylene tetrafluoride was charged, and the reaction was conducted for 18 hours to obtain a copolymer of the above-mentioned two monomers.

The copolymer was press-molded at 200° C. to obtain a film having a thickness of 150 $\mu$m (thickness: 150 $\mu$m, ion exchange capacity: 1.4 meq/g dry resin, p/q: 4, IR chart: see FIG. 1).

One side of the methyl carboxylate membrane thus obtained, was treated in 4N hydrochloric acid at 40° C. for 70 hours, and then vacuum-dried at 60° C.

Figure 2:
FIG. 2 is a cross-sectional microscopic photograph of a membrane subjected to a dyeing test after the hydrolysis in Example 1.
Figure 3:
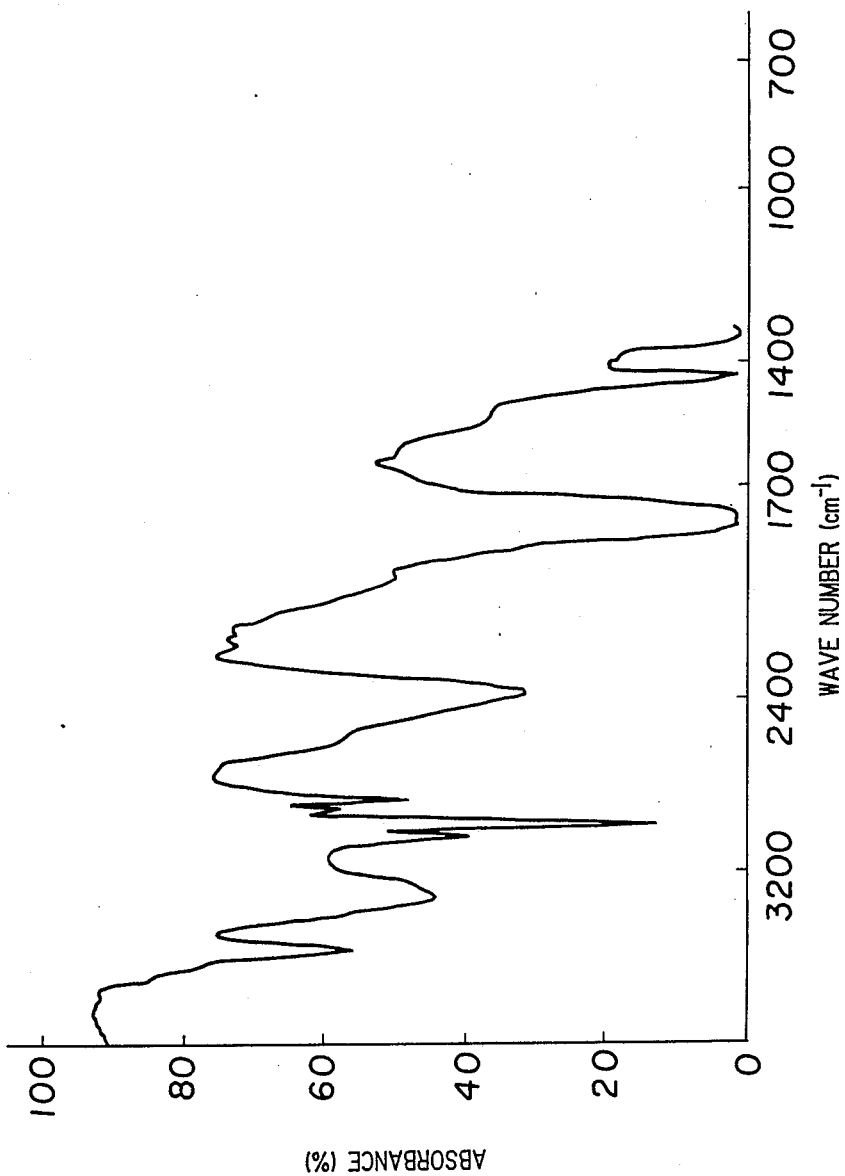
FIG. 3 is an infrared absorption spectrum after the hydrolysis in Example 1.

A colorless transparent membrane was obtained, in its dyeing test, it was colored violet in a thickness of about 80 $\mu$m by crystal violet (in a methanol solution) (see the microscopic photograph in FIG. 2). In the infrared absorption spectrum of the membrane thus obtained, an absorption by a hydroxyl group was observed at from 3500 to 3200 cm$^{-1}$, and a sharp absorption by an ester was observed at 1800 cm$^{-1}$ (see FIG. 3).

Then, the membrane was immersed in dry tetrahydrofuran under a nitrogen atmosphere, and dimethylamine gas (in an amount of 10% by volume relative to the dry tetrahydrofuran) was introduced under cooling with ice. The reaction was conducted under cooling for 12 hours and at 25° C. for 36 hours, and then the membrane was vacuum-dried at 60° C.

Figure 4:
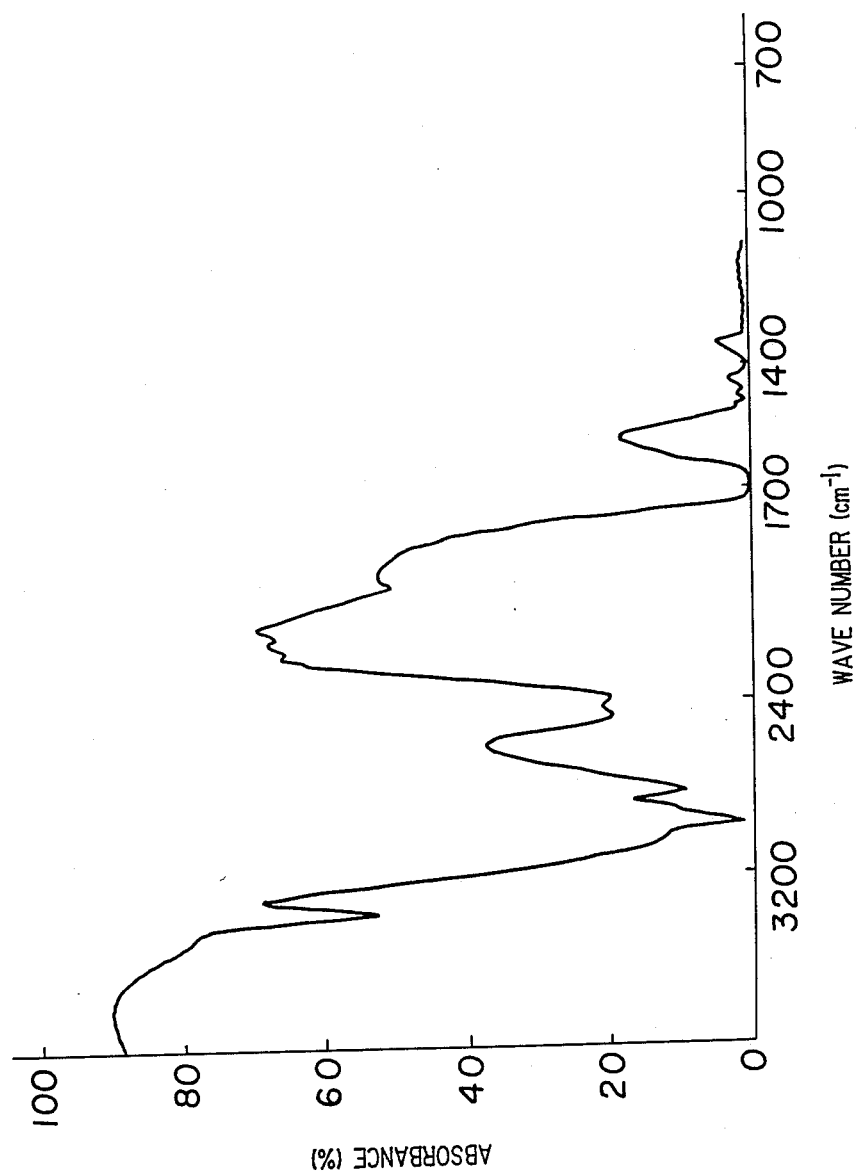
FIG. 4 is an infrared absorption spectrum after the amine treatment in Example 1.

A colorless transparent membrane was obtained, and in the infrared absorption spectrum, the absorption by an ester at 1800 cm$^{-1}$ disappeared, and an absorption by an amide was observed at 1700 cm$^{-1}$ (see FIG. 4).

Figure 5:
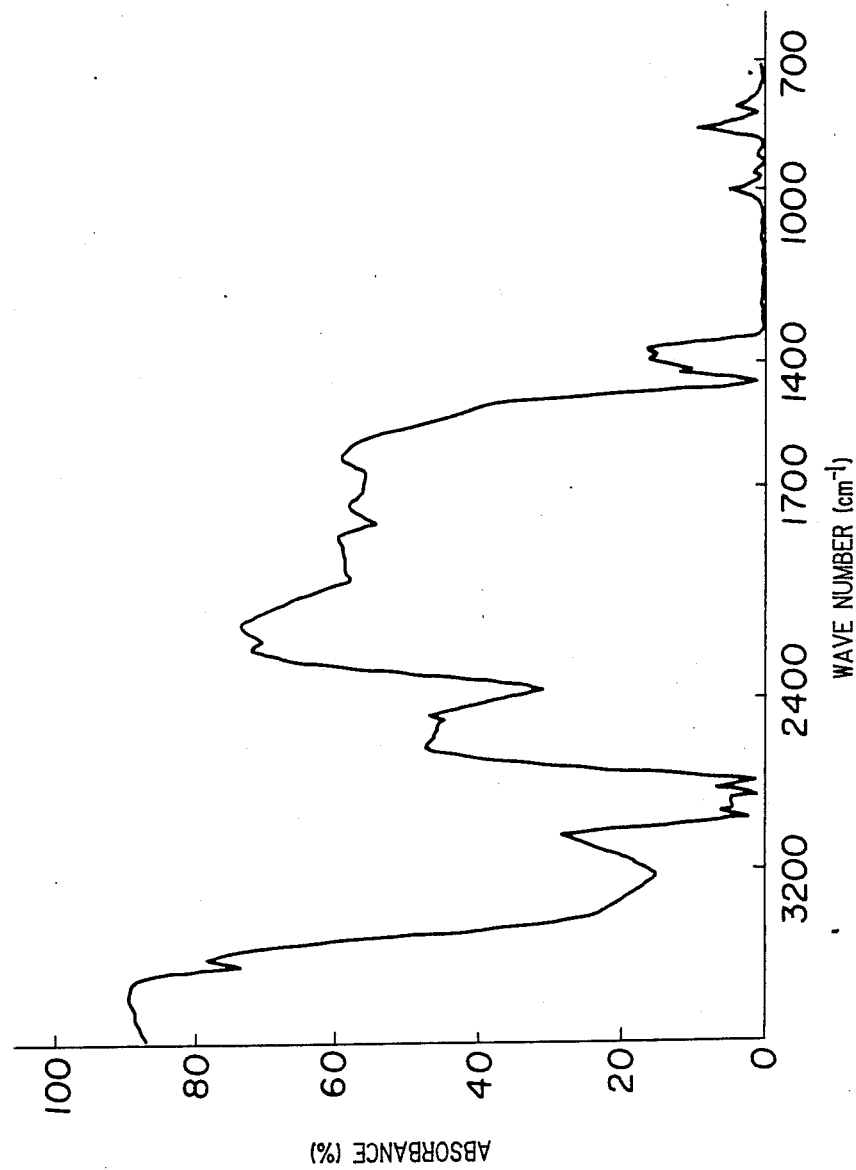
FIG. 5 is an infrared absorption spectrum after the reduction in Example 1.

Then, under a nitrogen atmosphere, sodium borohydride was added to dry tetrahydrofuran, and the membrane thus obtained, was immersed therein. Then, a boron trifluoride ether complex was dropwise added thereto. The reaction was conducted under reflux for 20 hours, whereupon the absorption at 1700 cm$^{-1}$ in the infrared absorption spectrum disappeared and thus, it was confirmed that the reduction of the amide proceeded completely (see FIG. 5).

The membrane thus obtained was washed with tetrahydrofuran and methanol, and then introduced in a methanol solution of methyl iodide (15% by volume) and reacted at 60° C. for 96 hours.

Then, this membrane was immersed in a solution comprising hydrochloric acid and methanol in a ratio of 1:2, whereupon a desired membrane having quaternary ammonium chloride groups, was obtained.

EXAMPLE 2

Figure 6:
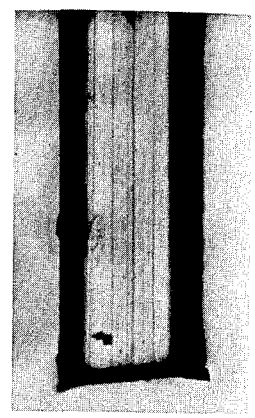
FIG. 6 is a cross-sectional microscopic photograph of the membrane subjected to a dyeing test after the hydrolysis in Example 2.

Both sides of the methyl carboxylate membrane as used in Example 1, was treated in 4N hydrochloric acid at 40° C. for 30 hours, and then vacuum-dried at 60° C. A colorless transparent membrane was obtained, and in its dyeing test, both sides of the membrane were colored in a thickness of about 30 $\mu$m with crystal violet (in a methanol solution) (see the microscopic photograph in FIG. 6). Further, in the infrared absorption spectrum of the membrane thus obtained, an absorption by a hydroxyl group was observed at from 3500 to 3200 cm$^{-1}$, and a sharp absorption by an ester was observed at 1800 cm$^{-1}$.

Then, the membrane was immersed in dry tetrahydrofuran in a nitrogen atmosphere, and dimethyl amine gas was introduced under cooling with ice. The reaction was conducted under cooling for 12 hours and at 25° C. for 36 hours, and then the membrane was vacuum-dried at 60° C.

A colorless transparent membrane was obtained, and in its infrared spectrum, the absorption by an ester at 1800 cm$^{-1}$ disappeared, and an absorption by an amide was observed at 1700 cm$^{-1}$.

Then, under a nitrogen atmosphere, sodium borohydride was added to dry tetrahydrofuran, and the membrane thus obtained, was immersed therein. Then, a boron trifluoride-ether complex was dropwise added thereto.

The reaction was conducted under reflux for 20 hours, whereupon the absorption at 1700 cm$^{-1}$ in the infrared absorption spectrum disappeared and thus it was confirmed that the reduction of the amide proceeded completely.

The membrane thus obtained, was washed with tetrahydrofuran and methanol, and then introduced into a methanol solution of methyl iodide and reacted at 60° C. for 96 hours.

Then, this membrane was immersed in a solution comprising hydrochloric acid and methanol in a ratio of 1:2, whereby a desired membrane having quaternary ammonium chloride groups, was obtained.

COMPARATIVE EXAMPLE 1

Figure 8:
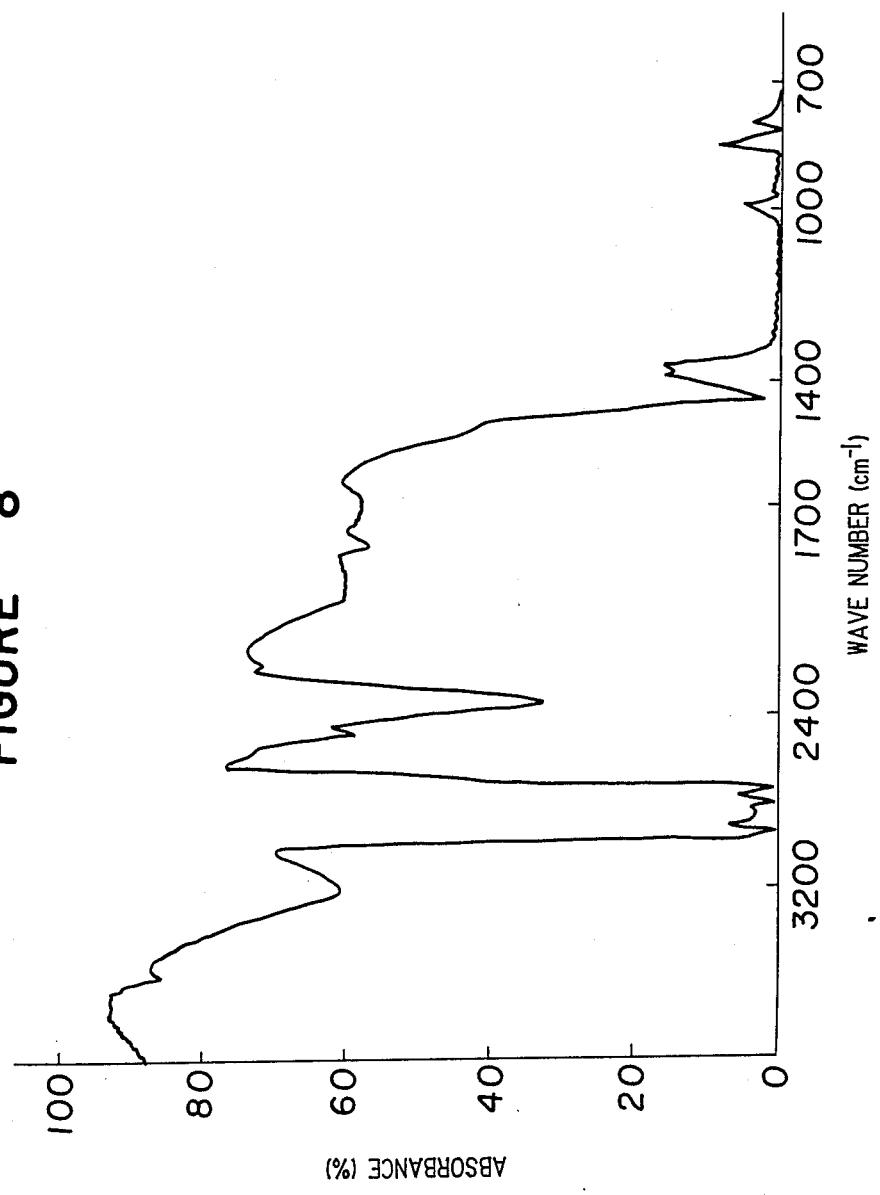
FIG. 8 is an infrared absorption spectrum after the reduction in Comparative Example 1.

The methyl carboxylate membrane as used in Examples 1 and 2, was immersed in dry tetrahydrofuran in a nitrogen atmosphere, and dimethylamine gas was introduced under cooling with ice. The reaction was conducted under cooling for 12 hours and at 25° C. for 36 hours for amidation (see FIG. 7). Then, in the same manner as in Examples 1 and 2, the reduction was conducted with sodium borohydride and the boron trifluoride-ether complex (see FIG. 8), and then the quaternization reaction was conducted with methyl iodide, to obtain an anion exchange membrane.

The resistance values, the transport numbers and the ion exchange capacities of the membranes obtained in Examples 1 and 2 and Comparative Example 1, are shown in Table 1.

EXAMPLE 3

A membrane treated with hydrochloric acid in the same manner as in Example 1, was immersed in dry tetrahydrofuran in a nitrogen atmosphere, and dry N,N-dimethylethylenediamine was added thereto. The reaction was conducted at 25° C. for 96 hours, and then the membrane was vacuum-dried at 60° C.

A colorless transparent membrane was obtained, and in its infrared absorption spectrum, the absorption by an ester at 1800 cm$^{-1}$ disappeared, and an absorption by an amide was observed at 1700 cm$^{-1}$.

Then, under a nitrogen atmosphere, sodium borohydride was added to dry tetrahydrofuran, and the membrane thus obtained, was immersed therein. A boron trifluoride-ether complex was dropwise added thereto. The reaction was conducted under reflux for 20 hours, whereupon the absorption at 1700 cm$^{-1}$ in the infrared absorption spectrum disappeared, and thus it was confirmed that the reduction of the amide proceeded completely.

The membrane thus obtained, was washed with tetrahydrofuran and methanol, and then introduced into a methanol solution of methyl iodide and reacted at 60° C. for 96 hours.

Then, this membrane was immersed in a solution comprising hydrochloric acid and methanol in a ratio of 1:2, whereby a desired membrane having quaternary ammonium chloride groups, was obtained.

COMPARATIVE EXAMPLE 2

A methyl carboxylate membrane as used in Example 1, was immersed in dry tetrahydrofuran under a nitrogen atmosphere, and then dry N,N-dimethylethylenediamine was added thereto. The reaction was conducted at 25° C. for 96 hours for amidation. Then, in the same manner as in Example 3, the reduction was conducted with sodium borohydride and the boron trifluoride-ether complex, and then the quaternization was conducted with methyl iodide, to obtain an anion exchange membrane.

The resistance values, the transport numbers and the ion exchange capacities of the membranes obtained in Example 3 and Comparative Example 2, are shown in Table 1.

EXAMPLE 4

A membrane treated with hydrochloric acid in the same manner as in Example 1, was immersed in dry tetrahydrofuran under a nitrogen atmosphere, and dry N,N-dimethylpropanediamine was added thereto. The reaction was conducted at 25° C. for 96 hours, and then the membrane was vacuum-dried at 60° C.

A colorless transparent membrane was obtained, and in its infrared absorption spectrum, the absorption by an ester at 1800 cm$^{-1}$ disappeared, and an absorption by an amide was observed at 1700 cm$^{-1}$.

Then, under a nitrogen atmosphere, sodium borohydride was added to dry tetrahydrofuran, and the membrane thus obtained was immersed therein. Then, a boron trifluoride-ether complex was dropwise added thereto. The reaction was conducted under reflux for 20 hours, whereupon the absorption at 1700 cm$^{-1}$ in the infrared absorption spectrum disappeared, and thus it was confirmed that the reduction of the amide proceeded completely.

The membrane thus obtained, was washed with tetrahydrofuran and methanol, and then introduced into a methanol solution of methyl iodide. The reaction was conducted at 60° C. for 96 hours.

Then, this membrane was immersed in a solution comprising hydrochloric acid and methanol in a ratio of 1:2, to obtain a desired membrane having quaternary ammonium chloride groups.

COMPARATIVE EXAMPLE 3

A methyl carboxylate membrane as used in Example 1, was immersed in dry tetrahydrofuran under a nitrogen atmosphere, and then dry N,N-dimethylpropanediamine was added thereto. The reaction was conducted at 25° C. for 96 hours for amidation. Then, in the same manner as in Example 4, the reduction was conducted with sodium borohydride and the boron trifluoride-ether complex, and then the quaternization was conducted with methyl iodide, to obtain an anion exchange membrane.

The resistance values, transport numbers and the ion exchange capacities of the membranes obtained in Example 4 and Comparative Example 3, are shown in Table 1.

TABLE 1

| Membrane | Electric resistance ($\Omega$ cm$^2$) | Transport number (t) | | | Ion exchange capacities (meq/g dry resin) |
| --- | --- | --- | --- | --- | --- |
| | | 0.1 N/1 N HNO$_3$ | 0.1 N/1 N HCl | 0.1 N/1 N H$_2$SO$_4$ | |
| Example 1 | 6.0 | 0.88 | 0.90 | 0.75 | 0.9 |
| Example 2 | 6.5 | 0.80 | 0.77 | 0.63 | 0.9 |
| Comparative Example 1 | 1.6 | 0.55 | 0.57 | 0.53 | 1.3 |
| Example 3 | 6.5 | 0.90 | 0.91 | 0.81 | 0.9 |
| Comparative Example 2 | 1.6 | 0.58 | 0.59 | 0.54 | 1.3 |
| Example 4 | 3.0 | 0.80 | 0.82 | 0.70 | 1.3 |
| Comparative Example 3 | 0.6 | 0.53 | 0.53 | 0.52 | 2.7 |

EXAMPLE 5

One side of a methylcarboxylate membrane obtained in the same manner as in Example 1, was treated in 14% aqueous ammonia at 20° C. for 80 minutes, and then vacuum-dried at 60° C. A colorless transparent membrane was obtained, and in its dyeing test, it was colored violet in a thickness of about 80 μm with crystal violet (in a methanol solution). In the same manner as in Example 1, dimethylamine gas, a reducing agent and methyl iodide were reacted to this membrane, and then the membrane was immersed in a solution comprising hydrochloric acid and methanol in a ratio of 1:2, to obtain a desired membrane having quaternary ammonium chloride groups.

EXAMPLE 6

One side of a methyl carboxylate membrane obtained in the same manner as in Example 1, was dipped in a 10% sodium hydroxide aqueous solution at 25° C. for 5 minutes, and the treated side was washed with pure water for 120 minutes Then, this membrane was vacuum-dried at 60° C. to obtain a colorless transparent membrane. In the same manner as in Example 1, dimethylamine gas, a reducing agent and methyl iodide were reacted to this membrane, and then the membrane was immersed in a solution comprising hydrochloric acid and methanol in a ratio of 1:2, to obtain a desired membrane having quaternary ammonium chloride groups.

The transport numbers and the ion exchange capacities of the membranes obtained in Examples 5 and 6, are shown in Table 2.

EXAMPLE 7

In the same manner as in Example 3, dry N,N-dimethylethylenediamine, a reducing agent and methyl iodide were reacted to the membrane treated with ammonia in the same manner as in Example 5. Then, the membrane was immersed in a solution comprising hydrochloric acid and methanol in a ratio of 1:2, to obtain a desired membrane having quaternary ammonium chloride groups.

EXAMPLE 8

In the same manner as in Example 4, dry N,N-dimethylpropanediamine, a reducing agent and methyl iodide were reacted to a membrane treated with ammonia in the same manner as in Example 5. Then, the membrane was immersed in a solution comprising hydrochloric acid and methanol in a ratio of 1:2, to obtain a desired membrane having quaternary ammonium chloride groups.

The transport numbers and the ion exchange capacities of the membranes obtained in Examples 7 and 8, are shown in Table 2.

TABLE 2

| | Transport number (t) | | | Ion exchange capacities (meq/g dry resin) |
|---|---|---|---|---|
| | 0.1 N/1 N $HNO_3$ | 0.1 N/1 N HCl | 0.1 N/1 N $H_2SO_4$ | |
| Example 5 | 0.97 | 0.99 | 0.89 | 0.9 |
| Example 6 | 0.65 | 0.67 | 0.62 | 1.2 |
| Example 7 | 0.98 | 0.99 | 0.90 | 0.9 |
| Example 8 | 0.92 | 0.94 | 0.83 | 1.3 |

REFERENCE EXAMPLE

An electrolytic process was conducted to produce nitric acid and sodium hydroxide from an aqueous sodium nitrate solution by an ion exchange membrane electrolytic method.

As the anion exchange membrane, the membrane obtained in Example 1, 5 or 6, or in Comparative Example 1, was used. As the cation exchange membrane, a Nafion membrane (tradename, manufactured by DuPont Co.) was used.

Figure 9:
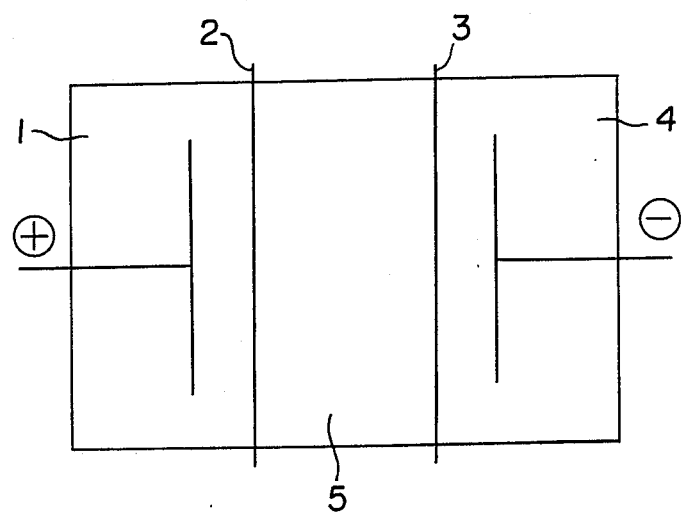
FIG. 9 is a schematic view of a three compartment electrolytic cell of Reference Example.

This electrolytic process is shown in FIG. 9. The electrolytic cell is a three compartment-type electrolytic cell comprising an anode compartment 1, an intermediate compartment 5 and a cathode compartment 4. The anode compartment 1 and the intermediate compartment are partitioned by an anion exchange membrane 2, and the intermediate compartment 5 and the cathode compartment 4 are partitioned by a cation exchange membrane 3. In the anolyte, nitric acid is produced from $H^+$ ions formed by the anode reaction i.e. the oxygen gas generation reaction, and $NO_3^-$ ions diffused through the anion exchange membrane. Likewise, in the catholyte, sodium hydroxide is produced from $OH^-$ ions formed by the cathode reaction i.e. the hydrogen gas generation reaction, and $Na^+$ ions diffused through the cation exchange membrane.

The concentrations of the anolyte and catholyte were maintained at constant levels by supplying water to the anode compartment and the cathode compartment.

The surface area of each electrode was 0.12 dm², and the distance between the anode and cathode was 2 cm. The electrolytic test was conducted for 1 week at a current density of 30 A/dm² at an electrolytic temperature of 70° C. by supplying 7 mol/liter of an aqueous sodium nitrate solution to the intermediate compartment and maintaining the nitric acid concentration in the anode compartment at 5 mol/liter and the concentration of an aqueous sodium hydroxide solution in the cathode compartment at 6 mol/liter.

The results of this electrolytic test, are shown in Table 3.

TABLE 3

| | Static transport number (%) | Dynamic transport number (%) | Cell voltage (V) |
|---|---|---|---|
| Example 1 | 88 | 70 | 4.10 |
| Example 5 | 97 | 79 | 4.52 |
| Example 6 | 72 | 52 | 3.80 |
| Comparative Example 1 | 55 | 34 | 2.81 |

According to the process of the present invention, an anion exchange membrane with its main chain made of a perfluorocarbon polymer, which is stable to the repetition of drying and wetting and which is superior in the oxidation resistance, heat resistance and solvent resistance, can be obtained as a membrane which has a high current efficiency and which is capable of effectively preventing the reverse diffusion of protons during the recovery of an acid by electrodialysis. Thus, the process of the present invention is effective to substantially increase the value of the membrane when the membrane is to be used for an industrial process.

We claim:

1. A process for preparing a heterogeneous anion exchange membrane having enhanced current efficiency and reduced reverse diffusion of protons, which comprises:

(a) treating from about 1 to 80% of the thickness of a carboxylate membrane made of a copolymer having repeating units of the formula;

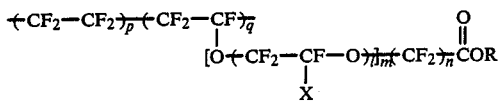

wherein X is F or CF$_3$, l is an integer of from 0 to 5, m is 0 or 1, n is an integer of from 1 to 5, and p/q is from 4 to 16, and R is a lower alkyl group, with a mineral acid which is effective as an acid catalyst for hydrolysis; or a base which is effective as a base catalyst for hydrolysis; and (b) reacting the treated membrane with
(i) a lower dialkylamine of the formula:

HNR$^1$R$^2$ wherein R$^1$ and R$^2$ are lower alkyl groups; or
(ii) a diamine of the formula:

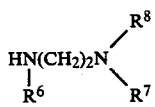

wherein R$^6$ is a hydrogen atom or a lower alkyl group, each of R$^7$ and R$^8$ is a lower alkyl group, or R$^6$ and R$^7$ together form a polyethylene group of the formula (CH$_2$)$_a$, wherein a is an integer of 2 or 3; or
(iii) a diamine of the formula:

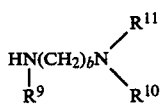

wherein R$^9$ is a hydrogen atom or a lower alkyl group, each of R$^{10}$ and R$^{11}$ is a lower alkyl group, or R$^9$ and R$^{10}$ together form a polymethylene chain of the formula CH$_2$)$_2$, wherein c is an integer of 2 or 3, and b is an integer of from 3 to 7; to thereby form a carboxylic acid amide membrane, which is treated with a reducing agent to form a corresponding amine membrane, which is then alkylated with a lower alkyl group to form a quaternary ammonium group-containing membrane.

2. The process according to claim 1, wherein the acid or base treatment is applied to one side or both sides of the membrane.

3. The process according to claim 1, wherein the acid treatment is conducted by using hydrochloric acid as the acid.

4. The process according to claim 1, wherein the acid treatment is conducted by using sulfuric acid as the acid.

5. The process according to claim 1, wherein the acid treatment is conducted by using nitric acid as the acid.

6. The process according to claim 1, wherein the base treatment is conducted by using aqueous ammonia as the base.

7. The process according to claim 1, wherein the base treatment is conducted by using sodium hydroxide as the base.

8. The process according to claim 1, wherein said quaternary ammonium group has the formula:

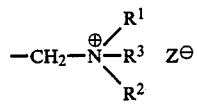

wherein each of R$^1$, R$^2$ and R$^3$ is a lower alkyl group, or R$^1$ and R$^2$ together form a tetramethylene group or a pentamethylene group, and Z$^-$ is a counter ion for the quaternary ammonium ion, selected from the group consisting of a halogen anion, NO$_3^-$, ½(SO$_4^{2-}$), BF$_4^-$, SbCl$_6^-$, $-$OSO$_2$R$^5$ and $-$OCOR$^5$ wherein R$^5$ is a lower alkyl group, a phenyl group or a lower perfluoroalkyl group.

9. The process according to claim 1, wherein said quaternary ammonium group has the formula:

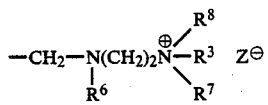

wherein R$^6$ is a hydrogen atom or a lower alkyl group, each of R$^7$ and R$^8$ is a lower alkyl group, or R$^6$ and R$^7$ together form a polymethylene chain of the formula (CH$_2$)$_a$ wherein a is an integer of 2 or 3, R$^3$ is a lower alkyl group, Z$^-$ is a counter ion for the quaternary ammonium ion, selected from the group consisting of a halogen anion, NO$_3^-$, ½(SO$_4^{2-}$), BF$_4^-$, SbCl$_6^-$, $-$OSO$_2$R$^5$ and $-$OCOR$^5$, wherein R$^5$ is a lower alkyl group, a phenyl group or a lower perfluoroalkyl group.

10. The process according to claim 1, wherein said quaternary ammonium group has the formula:

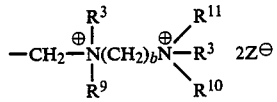

wherein R$^9$ is a hydrogen atom or a lower alkyl group, each of R$^{10}$ and R$^{11}$ is a lower alkyl group, or R$^9$ and R$^{10}$ together form a polymethylene group of the formula (CH$_2$)$_c$ wherein c is an integer of 2 or 3, b is an integer of from 3 to 7, R$^3$ is a lower alkyl group, and Z$^-$ is a counter ion for the quaternary ammonium ion, selected from the group consisting of a halogen anion, NO$_3^-$, ½(SO$_4^{2-}$), BF$_4^-$, SbCl$_6^-$, $^{31}$ OSO$_2$R$^5$ and $-$OCOR$^5$, wherein R$^5$ is a lower alkyl group, a phenyl group or a lower perfluoroalkyl group.

11. The process according to claim 1, wherein said base is an alkali metal hydroxide or an alkaline earth metal hydroxide.

12. The process according to claim 1, wherein said anion exchange membrane has an ion exchange capacity of from 0.16 to 30 meq/g of dry membrane.

13. The process according to claim 12, wherein said anion exchange membrane has an ion exchange capacity of from 0.5 to 2.8 meq/g of dry membrane.

14. The process according to claim 1, wherein said anion exchange membrane has a thickness of from 40 to 500 μm.

15. The process according to claim 1, wherein said carboxylate membrane is made of methyl carboxylate.

16. The process according to claim 1, wherein said dialkylamine of clause b)i) is selected from the group consisting of dimethylamine, diethylamine, dipropylamine and methyl ethyl amine.

17. The process according to claim 1, wherein said diamine of clause b)ii) is selected from the group consisting of N,N-dimethylkethylenediamine, N,N,N'-trimethylethylenediamine, N-methylpiperazine and N-propylpiperazine.

18. The process according to claim 1, wherein said diamine of clause (b)(iii) is selected from the group consisting of N,N-dimethylpropanediamine, N,N,N'-trimethylpropanediamine, N,N-dimethyl-butylenediamine, N,N,N'-trimethylbutylenediamine and N,N-diethylpropanediamine.

19. The process according to claim 1, wherein said carboxylic acid amide membrane is reduced with lithium aluminum hydride or diborane.

20. The process according to claim 1, wherein said corresponding amine membrane is alkylated with an alkylating agent selected from the group consisting of methyl iodide, ethyl bromide, n-propyl bromide, trimethyloxonium fluoroborate, triethyloxonium fluoroborate, trimethyl oxonium hexachloroantimonate and methyl trifluoromethanesulfonate.

21. An anion exchange membrane produced by the process of claim 1.

* * * * *